US011234054B2

(12) United States Patent
Bilal et al.

(10) Patent No.: US 11,234,054 B2
(45) Date of Patent: Jan. 25, 2022

(54) EDGE NETWORK SYSTEM FOR SERVICE-LESS VIDEO MULTICAST

(71) Applicants: Qatar University, Doha (QA); Qatar Foundation for Education, Science and Community Development, Doha (QA)

(72) Inventors: Kashif Bilal, Doha (QA); Kamran Zahoor, Doha (QA); Aiman Erbad, Doha (QA); Amr Mahmoud Salem Mohamed, Doha (QA); Mohsen Mokhtar Guizani, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 0 days.

(21) Appl. No.: 16/935,864

(22) Filed: Jul. 22, 2020

(65) Prior Publication Data
US 2021/0029413 A1 Jan. 28, 2021

Related U.S. Application Data

(60) Provisional application No. 62/877,136, filed on Jul. 22, 2019.

(51) Int. Cl.
*H04N 21/222* (2011.01)
*H04N 21/24* (2011.01)
(Continued)

(52) U.S. Cl.
CPC ..... *H04N 21/6405* (2013.01); *H04N 21/2187* (2013.01); *H04N 21/234* (2013.01);
(Continued)

(58) Field of Classification Search
CPC .......... H04N 21/6405; H04N 21/2187; H04N 21/2393
See application file for complete search history.

(56) References Cited

U.S. PATENT DOCUMENTS 8,904,014 B2 * 12/2014 Gonzales ............ H04L 67/1046
709/227
9,226,265 B2 12/2015 Gupta et al.
(Continued)

FOREIGN PATENT DOCUMENTS

WO 2018108168 A1 6/2018

*Primary Examiner* — Hsiungfei Peng
(74) *Attorney, Agent, or Firm* — K&L Gates LLP

(57) ABSTRACT

The typical service to deliver multimedia content is evolved Multimedia Broadcast Multicast Service (eMBMS). However, the eMBMS is a service-oriented network architecture requiring a pre-defined and pre-established user service to stream a live video. The content provider must be a multicast service provider to use the eMBMS services, which many typical content providers are not. Accordingly, the present disclosure provides a live video streaming network architecture that enhances the eMBMS architecture to enable service-less multicast delivery. The provided system includes a virtual network function service running on an application server (AS) that identifies potential multicast scenarios based on user requests for a live video stream within a confined area. The AS collects information from the cellular users, checks the information to validate a potential multicast scenario, and transmits the information to the eMBMS core on behalf of the content provider and user equipment to instantiate a multicast resource bearer.

20 Claims, 11 Drawing Sheets

(51) Int. Cl.
  *H04N 21/231* (2011.01)
  *H04N 21/234* (2011.01)
  *H04N 21/239* (2011.01)
  *H04N 21/258* (2011.01)
  *H04N 21/643* (2011.01)
  *H04N 21/6405* (2011.01)
  *H04N 21/2187* (2011.01)
  *H04N 21/6334* (2011.01)

(52) U.S. Cl.
  CPC ... *H04N 21/2393* (2013.01); *H04N 21/23106* (2013.01); *H04N 21/25841* (2013.01); *H04N 21/6334* (2013.01); *H04N 21/64322* (2013.01)

(56) References Cited

U.S. PATENT DOCUMENTS

| | | |
|---|---|---|
| 9,432,978 B2 | 8/2016 | Oyman |
| 9,537,668 B2 | 1/2017 | Bao et al. |
| 9,674,251 B2 | 6/2017 | Wang et al. |
| 9,942,748 B2 | 4/2018 | Zhu et al. |
| 2015/0319472 A1* | 11/2015 | Kotecha ............ H04M 1/72457 725/62 |
| 2018/0007519 A1 | 1/2018 | Jamadagni et al. |
| 2018/0146362 A1 | 5/2018 | Hou et al. |
| 2020/0045548 A1* | 2/2020 | Dowlatkhah ......... H04W 12/08 |
| 2020/0404499 A1* | 12/2020 | Zhu .................... H04N 21/6405 |

* cited by examiner

EDGE NETWORK SYSTEM FOR SERVICE-LESS VIDEO MULTICAST

PRIORITY CLAIM

The present application claims priority to and the benefit of U.S. Provisional Application 62/877,136, filed Jul. 22, 2019, the entirety of which is herein incorporated by reference.

BACKGROUND

Smartphones, tablets, and other portable/handheld devices have increased the frequency of video streaming. As a result, mobile data traffic has grown significantly and is expected to continue to do so. A majority of the mobile data traffic consists of video content, such as live video content. Typical content providers may provide thousands of video streams to millions of users at any given moment. In live video cast, multiple users within a confined vicinity may request the same content. It has been observed in live video traces that numerous users within the same vicinity request the same content. A separate flow in unicast mode for each of these users is streamed from the nearest cache/storage repository. The nearest storage repository is generally a point of presence (PoP) or a content delivery network (CDN). The delivery of the same content to many users within the same area considerably impacts network efficiency, cost, a service provider's quality of service (QoS), and viewers' quality of experience (QoE).

One option to address this demand for video traffic is multicast in a cellular Radio Access Network (RAN). In typical Long Term Evolution-Advanced (LTE-A) networks, live video streaming is generally performed via unicast transmission. Unicast transmissions, however, specifically in a scenario where multiple users from a limited area are watching the same stream/channel, put unnecessary load on transit, backhaul, and access networks, which wastes scarce resources at each tier, increase the delivery cost, and decrease the viewers' QoE. For instance, as a number of streaming users increases in a RAN, the desired radio resources used grows linearly, even when the users request identical video content. Conversely, multicast transmission offers an economical and scalable approach to transmit live videos to several users simultaneously using limited resources. Multicast may help content providers save resources by requiring content providers to fetch a less amount of user data from the CDN. Multicast may also help increase QoE and resource utilization efficiency because of resources saved at transit, backhaul, and RAN levels.

Typical cellular networks support multicast services. For instance, evolved Multimedia Broadcast Multicast Service (eMBMS) and Broadcast Multicast Service (BCMSC) are the typical services that are employed by mobile network operators to deploy broadcast/multicast architectures. However, such multicast transmissions are only carried out for predefined user services offered by multicast service providers (MSPs). Generally, these predefined services include broadcast/multicast TV, video conferencing, file download services, or an event-based transmission, such as a sporting event or a live concert. Typically, efforts to optimize video quality, bandwidth, and energy consumption of user equipment and the network in the wireless multicast services have considered a service-based architecture, where the content provider announces and initiates a service. This service-based architecture is not applicable for a typical live video provider that enables thousands of users to deliver live content without announcing a separate service for each video cast. Stated differently, the content provider must be a MSP to use the eMBMS services, which many typical content providers are not. Accordingly, eMBMS multicasts cannot be used for such typical live video providers.

In a typical eMBMS scenario, cellular network multicast can only be carried out by receiving the pre-announced content from the content provider and delivering the content only to the subscribed viewers. To multicast a video, the eMBMS requires various actions performed at the content provider and user equipment end. First, the content provider must be a MSP with its user services available for its subscribers. The content provider needs to contact the eMBMS for authentication and authorization. The user equipment needs to be subscribed to a content provider for a specific service. Then, the eMBMS needs to instantiate its own multicast bearer services to deliver the multicast user services. At the user equipment end, some services-related changes are also required. See *LTE Broadcast—Lessons Learned from Trials and Early Deployments*, https://www-.expway.com/wp-content/uploads/2016/12/LTE-Broadcast-Paper-Final-30-November-2016.pdf (2016). The user equipment should be able to receive the system information blocks (SIB) related to eMBMS, especially SIB-13, SIB-15, and SIB-16. Moreover, the user equipment needs to decode the SIBs correctly to receive multicast, support multicast operation on demand (MooD), and support unicast to multicast and multicast to unicast switching.

In addition, the introduction of new services typically demands network reconfiguration and on-the-spot installation of new equipment that in turn increases cost, ground area, power, and proficient service workforce. Hard-wired networks are tedious to take care of, time-consuming to evolve, and preclude service providers from providing dynamic services. Instead, network function virtualization technology is one solution to deal with the ever-increasing demands for a variety of hardware in typical telecom networks. In network function virtualization technology, applications may be retained by dynamically configurable cloud environments known as virtualized network functions (VNFs) that allow the networks to be swift and responsive towards the requirements of the services running over the VNF.

Accordingly, a need exists for a system that enables typical content providers to multicast live content streams.

SUMMARY

The present disclosure provides new and innovative systems and non-transitory, computer-readable mediums for managing the initiation and termination of multicast sessions to enable content providers that are not multicast service providers to multicast live content. The provided systems may be utilized to augment typical multimedia broadcast multicast services at the core network level. The provided systems minimize bandwidth utilization, RAN resources, and cost by reducing the number of streams per live event as compared to creating unicast sessions for each user device viewing the live event.

In an example, a system includes a plurality of user devices, a content provider system, a multimedia broadcast multicast service, and a proxy system. The content provider system is configured to provide contemporaneous media content, such as live video, over a network to the plurality of user devices. The proxy system is configured to manage the initiation and termination of multicast sessions between the plurality of user devices and the content provider system.

The proxy system includes a processor in communication with a memory. The proxy system's processor may receive a request from a respective user device for the content provider system to provide media content of a contemporaneous event. It may then determine whether a number of user devices viewing the media content meets a threshold. In response to determining that the number of user devices meets the threshold, a multicast session may be initiated.

Initiating the multicast session may include various actions. A service announcement header may be transmitted to the multimedia broadcast multicast service on behalf of the content provider system. Identification information may be received from the respective user device. A join request may be transmitted to the multimedia broadcast multicast service. The join request includes the received identification information from the respective user device. The join request may be received from the multimedia broadcast multicast service. Multicast authorization including a multicast IP address may be transmitted to the multimedia broadcast multicast service. A set of user devices including the respective user device may be assigned to the initiated multicast session associated with the multicast IP address. The multicast IP address may be transmitted to the set of user devices.

DETAILED DESCRIPTION

The present disclosure provides systems for enabling content providers that are not multicast service providers to manage multicast sessions of content, such as live content. In various examples, a system provided by the present disclosure may be implemented with the system architecture of a multimedia broadcast multicast service (MBMS), such as an enhanced multimedia broadcast multicast service (eMBMS). The provided system may be implemented with the MBMS or the eMBMS at the core network level.

Figure 1:
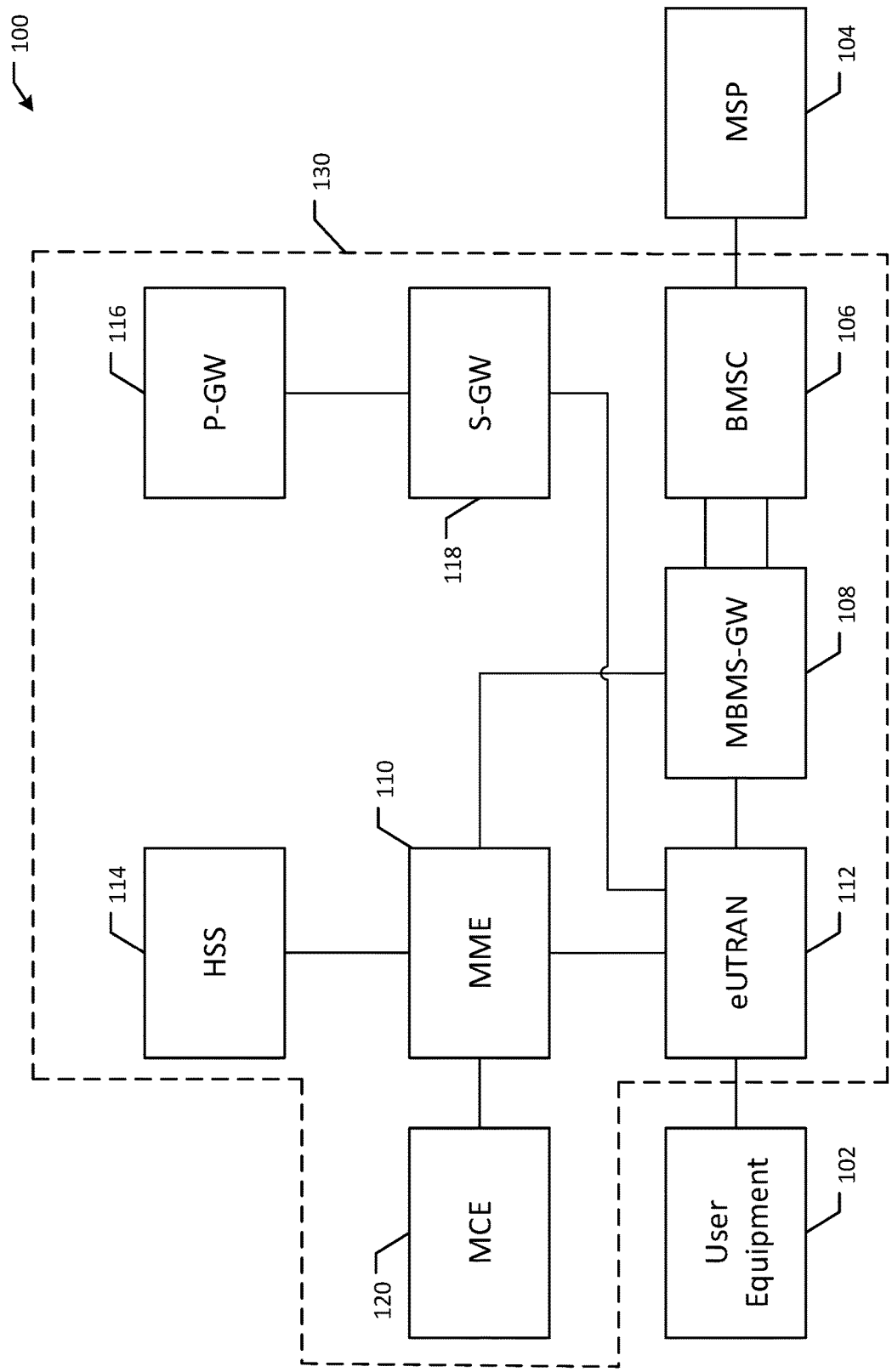
FIG. 1 illustrates a box diagram of an example enhanced multimedia broadcast multicast service architecture, according to an aspect of the present disclosure.

FIG. 1 illustrates a box diagram of an example system 100 including a typical eMBMS 130, user equipment 102, and a multicast service provider (MSP) 104. The user equipment 102 may include one or more user devices (e.g., smartphone, laptop, tablet, etc.). The eMBMS 130 is a point to multipoint (PTM) service for delivering specific content from one source to numerous destinations (e.g., user devices). Transmission of identical data to multiple user devices enables the user devices to share radio and core network resources, which increases network efficiency. The eMBMS 130 supports two transmission modes—broadcast and multicast mode. The eMBMS 130 uses a common channel for both the broadcast and multicast transmissions, irrespective of a number of destinations. This common channel can be the physical broadcast channel (PBCH) for broadcast or the physical multicast channel (PMCH) for multicast.

The architecture of the eMBMS 130 includes a broadcast multicast service center (BMSC) 106, an eMBMS-gateway (MBMS-GW) 108, a mobility management entity (MME) 110, an evolved UMTS terrestrial radio access network (eUTRAN) 112, a home subscriber server (HSS) 114, a packet gateway (P-GW) 116, a serving gateway (S-GW) 118, and a multicast/multicell coordination entity (MCE) 120. The BMSC 106 is the source of multicast content within the core network. The responsibilities of BMSC include: (1) authentication of the MSP 104, (2) authorization and authentication of the user equipment 102, (3) authorization and initiation of broadcast/multicast services, (4) creating a bearer service offered by the BMSC 106, and (5) coordinating with other eMBMS 130 entities to establish the bearer and user services. Authenticating the MSP 104 includes determining whether the MSP 104 offers a service. Authorizing and authentication the user equipment 102 includes determining whether the user equipment 102 is subscribed to the service provided by the MSP 104. Authorizing and initiating the broadcast/multicast services includes creating a user service offered by the MSP 104.

The MBMS-GW 108 performs the eMBMS data delivery received from the BMSC 106 to eNBs and service regions in single cell point to multipoint (SC-PTM) and multimedia broadcast multicast service single frequency network (MBSFN), respectively, during a multicast session. The MME 110 handles the handovers across cells within the service area. The MCE 120 handles the control signaling between the core of the eMBMS 130 and the eNBs. The bearer services of the eMBMS 130 are used to transmit the broadcast/multicast content. The bearer services are provided by a mobile network operator (MNO). However, before establishing the bearer service, the BMSC 106 within the MNO core and the user equipment 102 must be aware of the service of the eMBMS 130 through a service announcement.

The following processes are performed in the eMBMS 130 for the announcement of user services, the activation of a multicast service, and the joining of user devices. The MSP 104 contacts the BMSC 106 for the announcement of a user service (e.g., live coverage of a sporting event). The announcement contains service-related information, such as the information shown in Table 1 below.

TABLE 1

| Service ID | Service Type | Session Time | Media Type | Mode | Multicast IP Address | Charging Characteristics |
|---|---|---|---|---|---|---|

The BMSC 106 announces the user service to all the service areas mentioned in the service announcement. The service announcement may be performed via SMS message, wireless application protocol (WAP), cell broadcast, etc. The user equipment 102 of users interested in the user service activate a general purpose packet data protocol (PDP). The user equipment 102 sends an MBMS service request and an internet group management protocol (IGMP) join message to the BMSC 106. The join message contains the information shown in Table 2 below, including an international mobile subscriber identifier (IMSI) and an access point name (APN). The IMSI equals a sum of a mobile country code, a mobile network code, and a mobile station identification number.

TABLE 2

| Service ID | Multicast IP Address | IMSI | APN |
|---|---|---|---|

The BMSC 106 transmits the information received from the user equipment 102 of the interested users to the MSP 104 and requests the MSP 104 for authorization and authentication of the user equipment 102 as subscribed users of the service at issue. The MSP 104 responds to the request with a positive acknowledgement message if a respective user device of the user equipment 102 is indeed a subscribed user. The BMSC 106 requests the subscribed user devices of the user equipment 102 to active the PMM-connected mode and the user equipment context. As shown in Table 3 below, the user equipment context for a respective user device includes its IMSI, the multicast IP address, a temporary mobile group identity (TMGI), and an access point name (APN). The user equipment context is saved in both the user equipment 102 and the BMSC 106 after the user equipment-linking phase.

TABLE 3

| IMSI | Multicast IP Address | TMGI | APN |
|---|---|---|---|

The subscribed user devices of the user equipment 102 transmit an activate MBMS context request to the BMSC 106. The activate MBMS context request may include the multicast IP address, the APN, and the MBMS network service access point identifier (MBMS-NSAPI). The MBMS context includes the information in Table 4 below at the BMSC 106.

TABLE 4

| Service Area | TMGI | QoS Parameters | List of Cells | List of Downstream Nodes |
|---|---|---|---|---|

The BMSC 106 interrogates the MSP 104 for the availability of the service mentioned in the mentioned service area by transmitting the IMSI, the mobile station international subscriber directory number (MSISDN), and the routing area identity (RAI). The MSP 104 sends an acknowledgement to the BMSC 106 as an MBMS authorization response. The BMSC 106 transmits a MBMS registration response to the subscribed user devices of the user equipment 102. The BMSC 106 accepts the activate MBMS context request from the subscribed user devices of the user equipment 102. The BMSC 106 allocates TMGI for the subscribed user devices of the user equipment 102.

More detail with respect to the eMBMS 130 may be found in 3GPP, "3rd Generation Partnership Project; Technical Specification Group Services and System Aspects; Multimedia Broadcast/Multicast Service (MBMS); Architecture and functional description (Release 15)," Technical Specification, (Dec. 2017). The services of the eMBMS 130 are provisioned by sequentially performing the following phases: (1) subscription, (2) service announcement, (3) joining, (4) session start, (5) MBMS notification, (6) data transfer, (7) session stop, and (8) leaving. In the subscription phase, users subscribe to an MBMS service provided by a multicast service provider and may get charged for the service. In the service announcement phase, all the subscribed users are notified of all available user services mentioning the type of service and time of transmission. In the joining phase, the multicast user groups are formed and the users show their willingness for reception of an eMBMS bearer service.

The session start phase marks the start of a multicast session for the subscribed users. In the MBMS notification phase, the users are notified with a session start time showing that the data transfer has started. In the data transfer phase, the actual eMBMS data delivery is carried out on a multicast radio bearer. In the session stop phase, the broadcast/multicast session ends and the data delivery stops. The MNO bearer resources are released after the session stop phase. In the leaving phase, a user no longer desires to receive the eMBMS data and leaves the multicast session.

Typically, to initiate a multicast session using eMBMS 130 delivery, there are several requirements which must be met. In the subscription phase, the user equipment 102 must be subscribed with a pre-defined service offered by an MSP 104. The BMSC 106 must interrogate the MSP 104 for authentication and authorization that the user equipment 102 is subscribed with the service. In the service announcement phase, the BMSC 106 must announce the services ID only to the subscribed users. The service ID must be provided by the MSP 104. In the joining phase, the BMSC 106 must interrogate the user equipment 102 for identification information, such as MSISDN and cell ID. Then, the BMSC 106 decides the service area for the users and must allocate a TMGI accordingly.

Typical content providers that are not multicast service providers, particularly those that provide live video content, do not meet the requirements to initiate a multicast session using eMBMS 130 delivery. For instance, the viewers of a live video are typically not required to subscribe to the service. Additionally, such content providers do not typically announce the service. For instance, an MSP 104 typically streams a single video at a specific time (e.g., a sporting event, concert, etc.) whereas such typical content providers may broadcast thousands of streams at a single time. To stream a live video using multicast, such typical content providers would have to announce a separate service for each of the thousands of live videos, which is infeasible at the MSP level. In addition, such typical content providers do not follow a strict time schedule. Rather, a user may start streaming a video at any time for any duration via such typical content providers. Accordingly, such typical content providers do not meet the basic requirements to use the eMBMS architecture for multicast.

The present disclosure provides systems that enable content providers that are not multicast service providers to use the eMBMS architecture for multicast. The provided system may be implemented with a typical eMBMS architecture at the core network level with minimal to no changes in the typical eMBMS architecture. In various examples, the provided system is a virtual network function service. The presently disclosed system acts as a proxy system between a content provider and user equipment. The provided proxy system imitates the actions required by the content provider and the user equipment to initiate a multicast session or service.

For instance, the system acts on behalf of the content provider to announce a multicast service for the BMSC. The system may act on behalf of the content provider to provide the BMSC with media description and session description containing parameters such as a type of service, a service ID, and a time of transmission. Similarly, the system communicates with the BMSC on behalf of user equipment for the subscription and authentication phase. The system may act on behalf of the user equipment to provide MSISDN and a Cell ID at the attachment phase for subscription and an ID of the user equipment or device at the joining phase. The BMSC may create TMGI and authenticate and authorize the user equipment and content provider through the provided proxy system. When all requirements for an eMBMS multicast are met, a video is multicast using a typical eMBMS.

The provided system monitors all content requests from user equipment to a content provider and initiates or terminates multicast sessions in real-time based on a current demand for a particular video within a service area covered by the core network. For example, if a user requests a live video stream that is already being transmitted to another user within the same cell or service area, the provided system may perform the required steps on behalf of the content provider and the user's device to create a multicast bearer for that particular live video stream in that particular cell or service area. If one of the users were to leave the live video stream, the provided system may terminate the multicast session and initiate a unicast session.

Accordingly, the provided system enables content providers that are not multicast service providers to multicast using a typical eMBMS architecture. Enabling multicasting of live videos minimizes bandwidth utilization, RAN resources, and costs as compared to unicasting the live videos by reducing the number of streams per content. As a result, network efficiency and users' viewing experience is improved.

Figure 2:
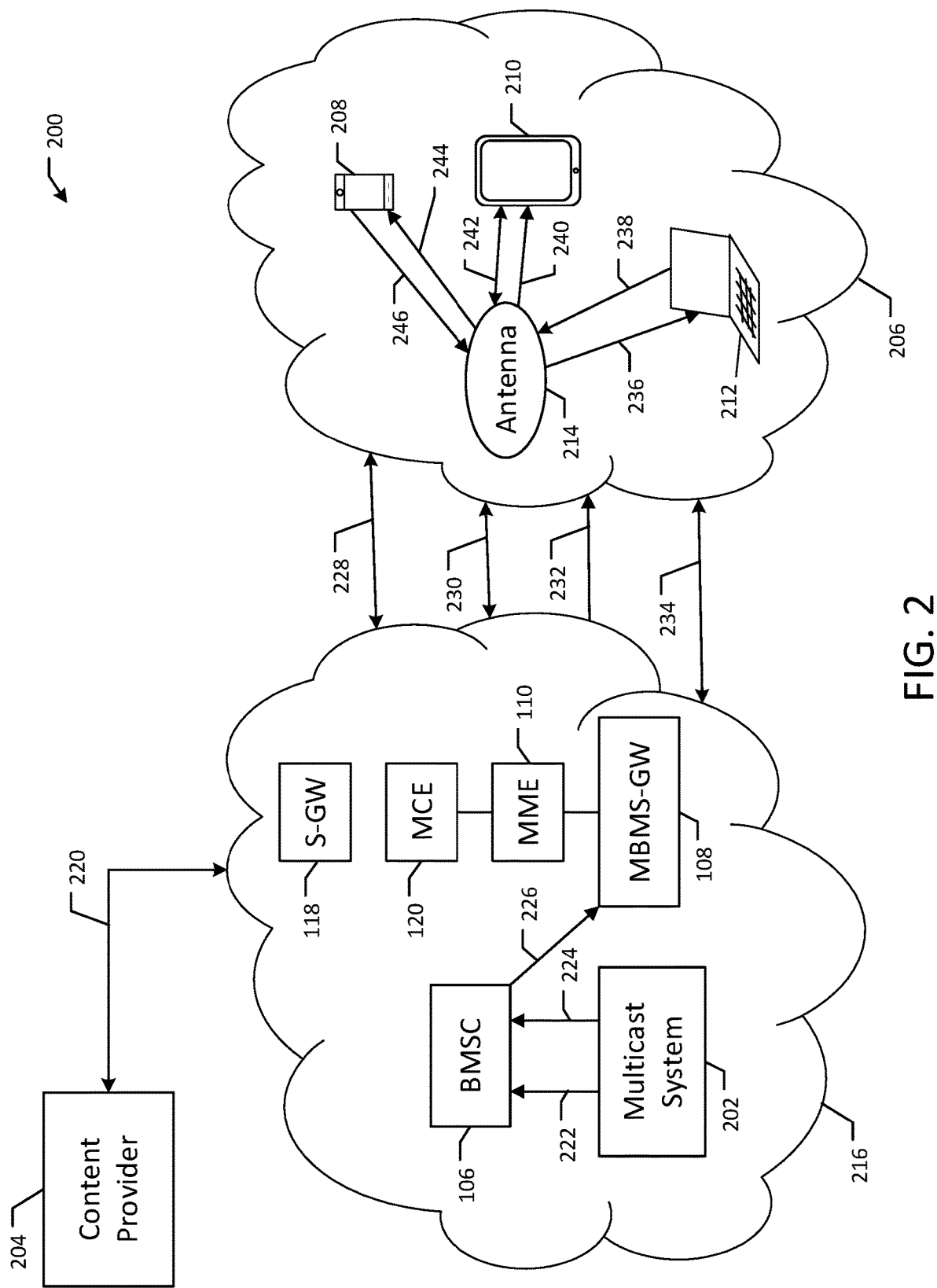
FIG. 2 illustrates a box diagram of a system for managing multicast sessions between a content provider and user devices, according to an aspect of the present disclosure.

FIG. 2 illustrates a box diagram of an example system 200 for managing multicast sessions between a content provider 204 and user devices 208, 210, 212. The system 200 includes the content provider 204, a MNO core 216, a radio access network (RAN) 206. The content provider 204 and the MNO core 216 communicate over a network. The MNO core 216 and the RAN 206 also communicate over a network. Either network can include, for example, the Internet or some other data network, including, but not limited to, any suitable wide area network or local area network. The content provider 204 provides contemporaneous (e.g., live) media content for viewing over a network, though the content provider 204 is not a MSP. In other examples, the components of the system 200 may be combined, rearranged, removed, or provided on a separate device or server.

The MNO core 216 includes an MBMS, such as an eMBMS, and a multicast system 202. For instance, the MNO core 216 includes a BMSC 106, a MBMS-GW 108, a MME 110, a MCE 120, and a S-GW 118. The MNO core 216 may also include the other components described with respect to the eMBMS 130 in FIG. 1. In various aspects, the multicast system 202 may be a virtual network function service. The RAN 206 includes an antenna 214 in communication with user devices 208, 210, and 212. The user devices 208, 210, and 212 may be any suitable device capable of transmitting and receiving data over a network. For example, the user device 208 is illustrated as a smartphone, the user device 210 is illustrated as a tablet, and the user device 212 is illustrated as a laptop. Other example devices may include a smart TV, a smartwatch, a desktop computer, etc.

The multicast system 202 acts as a proxy of the content provider 204 and the user devices 208, 210, 212 by communicating with the eMBMS on behalf of the content provider 204 and the user devices 208, 210, and 212. Acting as a proxy, the multicast system 202 enables the content provider 204 to multicast content to the user devices 208, 210, and 212 via the eMBMS architecture even though the content provider 204 is not a MSP. A number of data streams are illustrated to show how an ongoing unicast transmission from the content provider 204 to the user device 210 is converted to a multicast transmission.

The ongoing unicast transmission is illustrated by the data streams 220, 228, and 242. The ongoing unicast transmission may be of, for example, a live sporting event. The user device 208 by the data stream 246 and the user device 212 by the data stream 238 may each request to view the same live sporting event. The requests are communicated to the MNO core 216 by the data stream 230. If the number of viewers of the live sporting event meet a threshold (e.g., more than one), then the multicast system 202 may initiate a multicast session for the live sporting event. The multicast system 202 communicates parameters of the content provider 204 to the BMSC 106 via the data stream 224. The multicast system 202 requests and receives various identification information from the user devices 208 and 212 via the data stream 234. The multicast system 202 transmits service parameters of the live sporting event to the BMSC 106 via the data stream 222. At this point, all the requirements of an eMBMS multicast are met and the BMSC 106 initiates a multicast transmission to the user devices 208, 210, and 212 via the data streams 226, 232, 236, 240, and 244. In this way, the single unicast data stream 220 from the content provider 204 is converted to multiple multicast data streams 236, 240, and 244.

Figure 3:
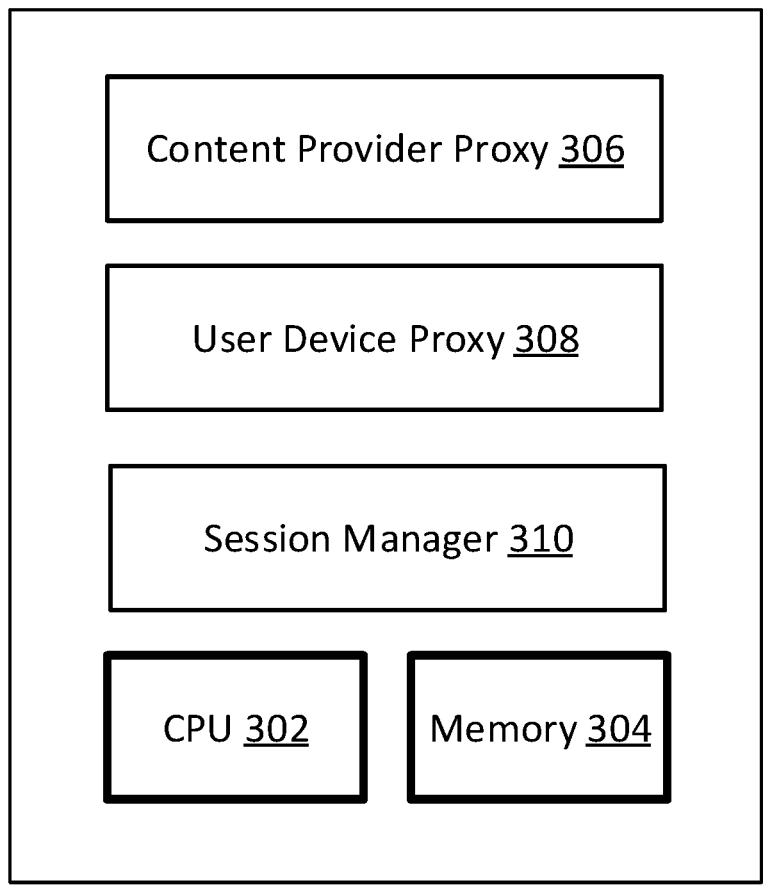
FIG. 3 illustrates a box diagram of a multicast system for managing multicast sessions, according to an aspect of the present disclosure.

FIG. 3 illustrates a box diagram of an example multicast system 202. The example multicast system 202 includes a processor in communication with a memory 304, a content provider proxy 306, and a user device proxy 308, and a session manager 310. The processor may be a CPU 302 or any other similar device. In other examples, the components of the multicast system 202 may be combined, rearranged, removed, or provided on a separate device or server.

The content provider proxy 306 is programmed to imitate or perform actions on behalf of the content provider 204. For example, the content provider proxy 306 may be programmed to contact the BMSC 106 for the announcement of a user service. The content provider proxy 306 may be programmed to transmit an acknowledgment to the BMSC 106 that a user device is a subscribed user. The content provider proxy 306 may be further programmed to transmit an acknowledgement or MBMS authorization response to the BMSC 106 in response to a query about service availability. The content provider proxy 306 may be implemented by software executed by the CPU 302. In at least one example, the content provider proxy 306 is programmed according to Algorithm 1 below.

---
Algorithm 1.
---
Input: Service_ID
If (Service ID received )
    request MSISDN, Cell_ID, Media_Description to UE-Proxy
    receive MSISDN, Cell_ID, Media_Description from UE-Proxy
    Send Service_ID, Media_Description, Session_Description, Type_of_Service to BMSC
End if
If (UE_interrogation received )
    Send MSISDN, Cell_ID to BMSC
End if
If (Multicast_IP received )
    Set TMGI = Service_ID + MCC + MNC
    Send TMGI, Multicast_IP to BMSC
End if

---

The user device proxy 308 is programmed to imitate or perform actions on behalf of user devices 208, 210, 212. For example, the user device proxy 308 may be programmed to activate a general purpose packet data protocol (PDP). The user device proxy 308 may also be programmed to transmit an MBMS service request and an internet group management protocol (IGMP) join message to the BMSC 106. The join message may contain information including an international mobile subscriber identifier (IMSI) and an access point name (APN). The user device proxy 308 may be further programmed to transmit an activate MBMS context request to the BMSC 106, in which the active MBMS context request includes a multicast IP address, an APN, and a MBMS network service access point identifier (MBMS-NSAPI). The user device proxy 308 may be implemented by software executed by the CPU 302. In at least one example, the user device proxy 308 is programmed according to Algorithm 2 below.

---
Algorithm 2.
---
Input: Potential_Multicast_Situation_Signal
If (Potential_Multicast_Situation_Signal received)
    Send SIB_1 to UE with SystemInfoValueTag = TRUE
    Wait ModificationPeriod = 8ms
    Send SIB_2 to UE
    Wait ModificationPeriod = 8ms
    Send SIB_13 inquiry to UE for MSISDN, Cell_ID, Media_Description
    Wait for SIB_13 response from UE
    Send MSISDN, Cell_ID, Media_Description to Monitor
End if
If (request received from CP-Proxy)
    Send MSISDN, Cell_ID, Media_Description to CP-Proxy
End if
If (Service_Announcement_Received )
    Decode Service_ID, Session_Description
    Send Session_Acknowledgment
End if

---

The session manager 310 is programmed to manage the initiation and termination of multicast sessions by determining whether certain content should be delivered as unicast or multicast. The session manager 310 may be programmed to monitor all incoming requests for content (e.g., live video content). In response to such monitoring, the session manager 310 manages the initiation of multicast sessions. In at least one example, the session manager 310 may be programmed according to Algorithm 3 depicted below. The session manager 310 may be implemented by software executed by the CPU 302.

---
Algorithm 3.
---
Input: User ID, Video ID, eNB Id
lookup Video ID AND eNB ID in MulticastSessions table
if (found)
    increment Tviewers in Videosinfo table by 1
    increment Tviewers in eNBsinfo table by 1
    add User ID, Video ID, eNB ID in Usersinfo table
End if
Else
    lookup Video ID in VideosInfo table
    if (found)
        lookup eNB ID in eNBsInfo table
        if (found)
            Generate Service_ID
            add Service_ID, Video ID, MulticastAddress, eNB ID in MulticastSessions table
            set status = M
            increment Tviewers in Videosinfo table by 1
            increment Tviewers in eNBsinfo table by 1
            increment Tcells in Videosinfo table by 1
        End if
    Else
        Set status = U
        add User ID, Video ID, eNB ID in Usersinfo table
        add User ID, Video ID, eNB ID in Videosinfo table
        add User ID, Video ID, eNB ID in eNBsinfo table
    End if

---

The session manger 306 may also monitor when users cease viewing content. In response to such monitoring, the session manager 310 manages the termination of multicast sessions. In at least one example, the session manager 310 may be programmed according to Algorithm 4 depicted below.

---
Algorithm 4.
---
Input: User ID, Video ID, eNB ID
lookup eNB ID in eNBsInfo table
if (Tviewers < $\tau_1$)
    lookup Video ID in VideosInfo table
    if (Tviewers < $\tau_2$)
        delete Service_ID from MulticastSessions
    End if
End if
Else
    decrement Tviewers in eNBsInfo table by 1
    decrement Tviewers in VideosInfo table by 1
    lookup eNB ID in eNBsInfo table
    if (Tviewers = 0)
        delete eNB ID from eNBsInfo table
    End if
    lookup Video ID in VideosInfo table
    if (Tviewers = 0 OR Tcells = 0)
        delete Video ID from VideosInfo table
    End if

---

The session manager 310 may be programmed to initiate and terminate multicast sessions based on whether a number of viewers in a particular area for a particular content (e.g., live video) meets a threshold. If the number of viewers meets the threshold (e.g., two, three, ten, twenty, fifty, one hundred, etc.), the session manager 310 may initiate a multicast session. If the number of viewers in a multicast session decreases such it no longer meets the threshold, then the session manager 310 may terminate the multicast session. After termination, the session manager 310 may be programmed to initiate one or more individual unicast sessions. In at least one example, the session manager 310 may be programmed according to Algorithm 5 depicted below.

Algorithm 5.

Figure 4:
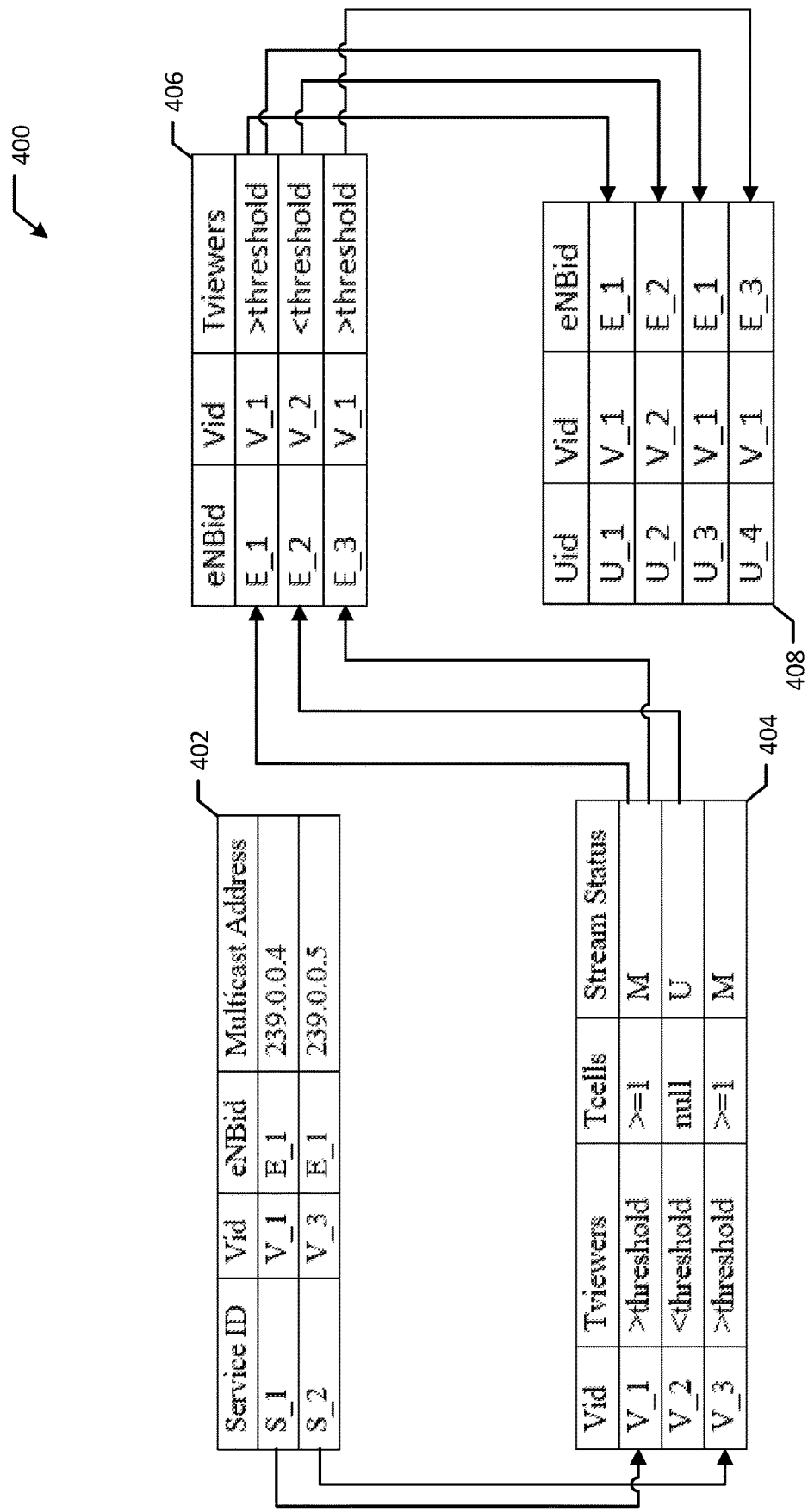
FIG. 4 illustrates a flow diagram showing a relationship among tables that manage active user device information, according to an aspect of the present disclosure.

Input: User ID, Video ID, eNB ID
lookup eNB ID in eNBsInfo table
If (Tviewers > $\tau_1$)
    lookup Video ID in VideosInfo table
    if(Tviewers > $\tau_2$)
        add Service_ID, Video ID, eNB ID, Multicast_IP_Address in MulticastSessions table
        call UE-Proxy( )
        if (Cell_ID, Media_Description received)
            call CP-Proxy (Service_ID)
        End if
        If (Service_Description_Acknowledgment received)
            Send TMGI, Multicast_IP_Address to CP-Proxy
        End if
    End if
End if In various instances, the session manager 310 manages the number of user devices viewing a particular content in a particular area by storing information on users currently viewing the content in tables in the memory 304. FIG. 4 illustrates a flow diagram showing an example relationship 400 among tables 402, 404, 406, and 408 storing user information. The table 402 may include information related to ongoing multicast sessions, such as identification of a service created for the multicast session (Service ID), identification of a particular content item such as a particular video (Vid), identification of one or more particular eNB (eNBid), and a multicast IP address. The Service ID may be dynamically generated on behalf of the content provider 204. The table 404 may include information related to all of the active content (e.g., videos) being watched within the service area covered by the MNO core 216. For example, the table 404 may include the Vid of each active content, a total number of viewers (Tviewers), a total number of cells (Tcells), and a transmission status of a particular content such as unicast (U) or multicast (M).

The table 406 may include information on viewers for specific content within one eNB coverage area. This information may include Vid, eNBid, and Tviewers. The table 308 may include information on a particular user viewing content. For instance, this user information may include a user ID (Uid) such as a phone number, an identification of the eNB of the user (eNBid), and a Vid of the video the user is watching. The eNB of the user may indicate a particular area or location in which the user is viewing the content.

The relationship among the table entries will now be explained to demonstrate how the session manager 310 may monitor information pertaining to various content, user devices, and viewing locations. The first entry in the table 402 corresponds to the first entry in the table 404 since they each relate to the video V_1. The second entry in table 402 corresponds to the third entry in the table 404 since they each relate to the video V_3. The first entry in the table 404 corresponds to each of the first and third entries in the table 406 since they each relate to the video V_1. The table 406 indicates that there are two separate eNB's corresponding to the video V_1. The second entry in the table 404 corresponds to the second entry in the table 406 since they both relate to the video V_2. The first entry in the table 406 corresponds to each of the first and third entries in the table 408 since they each relate to both the video V_1 and the eNB E_1. The second entry in the table 406 corresponds to the second entry in the table 408 since they each relate to video V_2 and the eNB E_2. The third entry in the table 406 corresponds to the fourth entry in the table 408 since they each relate to the video V_1 and the eNB E_3.

On arrival of a request to view content (e.g., video), the session manager 310 may consult the table 402 for a collective entry of Vid and eNBid that corresponds to the requested video. If the Vid and eNBid is available, the number of total viewers in the table 404 and the table 406 are incremented by one, and the Vid is updated with the currently requested video. If the Vid and eNBid is not available, then a new record is inserted that includes a Uid, a Vid, and a eNBid in the tables 404, 406, and 408. The Vid may be searched for in the table 404, and if found, the eNBid may be searched for in the table 406.

If the eNBid is found, then the number of viewers are incremented by one in the tables 404 and 406 and the number of cells are incremented by one in table 404. Additionally, a Service ID is generated. The Service ID, Vid, eNBid, and MulticastAddress are added to the table 402 and the status of the Vid is set as multicast in the table 404. If the eNBid is not found, a new entry is created in the tables 404, 406, and 408. Additionally, the status of the Vid is set as unicast in the table 404. The above process is repeated in reverse order when a viewer leaves a video session. For instance, user details are removed from the table 408, total viewers are decremented by one in the table 404 (or the video record is deleted), viewers are decremented by one in the table 406, and in some instances the status of the Vid is set as unicast in the table 404. In such instances, the session manager 310 terminates a multicast session and initiates a unicast session.

Figure 5:
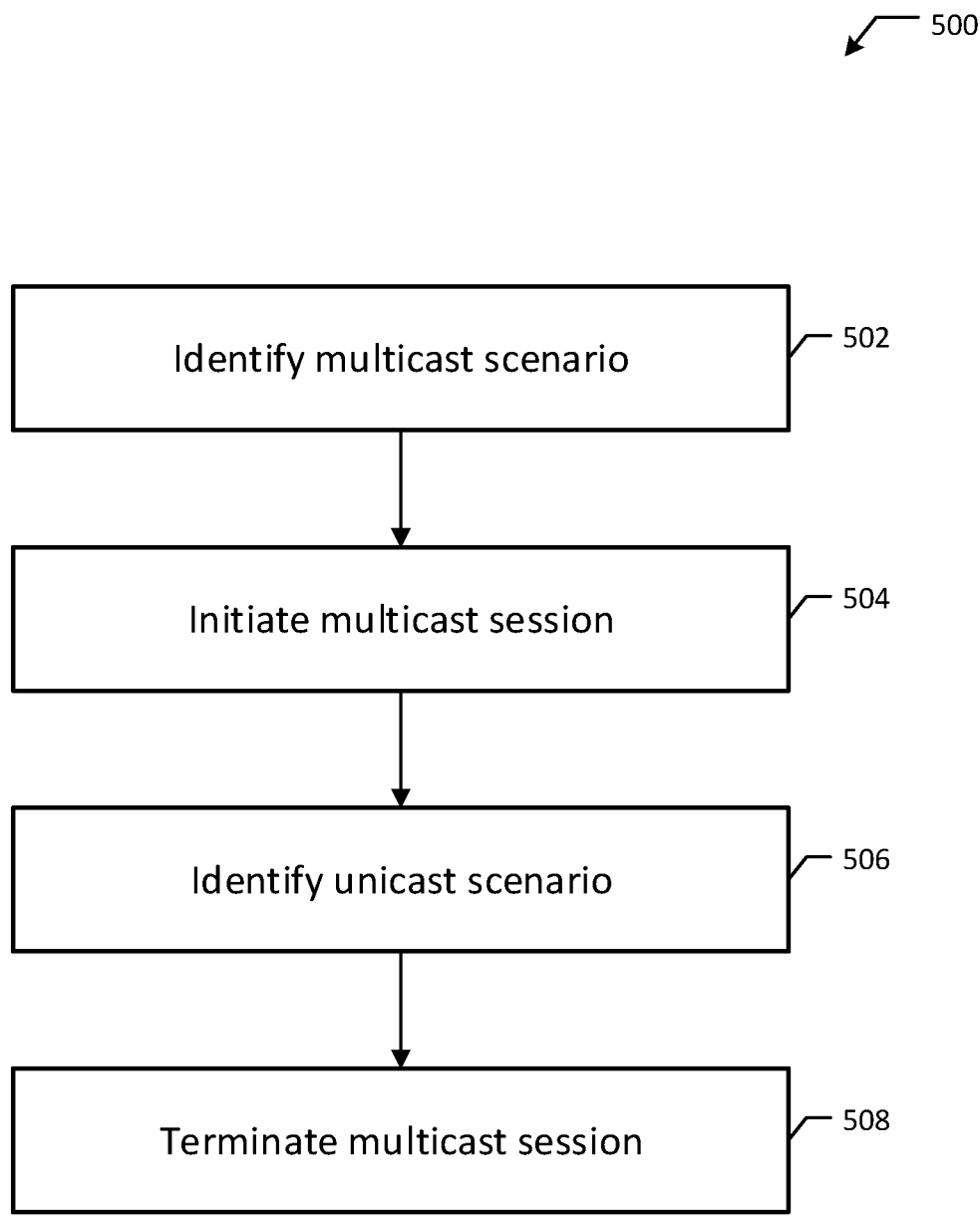
FIG. 5 illustrates a method for managing the initiation and termination of multicast sessions, according to an aspect of the present disclosure.

FIG. 5 illustrates a flow chart of an example method 500 for managing the initiation and termination of multicast sessions. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the example method 500, a multicast scenario is identified (block 502). For example, the session manager 310 of the multicast system 202 may determine that a threshold number (e.g., two) of user devices (e.g., the user devices 208 and 210) in a particular area (e.g., a particular eNB) are viewing a particular live video. For instance, the user device 208 may have already been viewing the live video from a specific eNB and a request to view the live video from the user device 210 via the same eNB triggers the session manager 310 to identify a multicast scenario. In various aspects, the session manager 310 may monitor the number of user devices viewing a particular video in a particular area via the tables 402, 404, 406, and 408 in order to identify a multicast scenario.

Once a multicast scenario is identified, a multicast session is initiated (block 504). In an example, the session manager 310 may initiate a multicast session with the BMSC 106 of the eMBMS 130. For instance, the session manager 310 may initiate the multicast session by triggering the content provider proxy 306 to act on behalf of the live video's content provider and the user device proxy 308 to act on behalf of the user devices 208 and 210. The content provider proxy 306 provides media description and session description containing parameters such as a type of service, a service ID, and a time of transmission. The user device proxy 308 provides MSISDN and cell ID at an attachment phase for subscription and provides user device ID at a joining phase.

In at least one example, a multicast session may be initiated with the user device 208 as follows. The content provider proxy 306 may contact the BMSC 106 on behalf of the content provider 204 to provide a service announcement. The service announcement may include a header that includes the information in Table 5 below. The BMSC 106 may transmit the received service announcement within the service area indicated in the header.

TABLE 5

| Service ID | Service Type | Session Time | Media Type | Mode | Multicast IP Address | Service Area |
|---|---|---|---|---|---|---|
| XXX | Video Streaming | Current Time | Video | Multicast | 239.0.0.X | Cell ID of user device |

The user device proxy 308 transmits SIB_1 to the user device 208 with SystemInfoValueTag=TRUE on the Uu interface. After waiting a modification period (e.g., 8 ms), the user device proxy 308 transmits Send SIB_2 to the user device 208 stating that network conditions have changed and wait another modification period. Then the user device proxy 308 transmits Send SIB_13 inquiry to the user device 208, for MSISDN, Cell ID, NSAPI, and Media Description. Upon reception of the SIB-13 response from the user device 208, the user device proxy 308 transmits MSISDN, Cell ID, and Media Description to the session manager 310. The user device proxy 308 generates an IMSI. The user device proxy 308 then activates a PDP instance on behalf of the user device 208 and transmits a MBMS Service Request and IGMP join message to the BMSC 106 over the MB2 interface. The IGMP join message may include the generated IMSI, cell ID of the user device 208, an APN, a Service ID, and a multicast IP address.

Upon receiving the MBMS Service Request and IGMP join message from the user device proxy 308, the BMSC 106 transmits information to the content provider proxy 306 (which acts on behalf of the content provider 204) on the xMB interface for authorization of the user device 208. In response, the content provider proxy 306 transmits a positive acknowledgement message to the BMSC 106 on behalf of the content provider 204 to provide authorization for the user device 208. The BMSC 106 asks the user device proxy 308 (which acts on behalf of the user device 208) to activate the PMM-Connected mode and the user equipment context. The user device proxy 308 stores the user equipment context on behalf of the user device 208. The user equipment context may include IMSI, multicast IP address, APN name, and TMGI.

The user device proxy 308 transmits Activate MBMS Context Request to the BMSC 106 over the MB2 interface. The Activate MBMS Context Request may include a multicast IP address, APN name, and NSAPI. Upon receiving the Activate MBMS Context Request, the BMSC 106 transmits the IMSI, MSISDN, and RAI to the content provider proxy 306 (which acts on behalf of the content provider 204) over the xMB interface to check the availability of service in the cell. The content provider proxy 306 transmits a MBMS Authorization Response to the BMSC 106 on behalf of the content provider 204 to confirm service availability. The BMSC 106 transmits a MBMS Registration Response to the user device proxy 308 (which acts on behalf of the user device 208). The session manager 310 may then add the user device 208 to a multicast group and allocate the TMGI and multicast IP address to the multicast group.

The user device proxy 308 transmits SIB-1 to the user device 208 with SystemInfoValueTag=TRUE. The user device proxy 308 requests the user device 208 to activate PMM Connected Mode. The user device proxy 308 transmits SIB-13 to the user device 208 with new media description mentioning the multicast IP address of the multicast group. At this point, the BMSC 106 begins delivering the eMBMS data of the live video on the multicast IP address to begin the multicast session. The above-described process of initiating a multicast session for the user device 208 may be performed for each user device (e.g., the user devices 210 and 212) that is viewing or requesting to view the same live video in the same area as the user device 208.

At some point after a multicast session is initiated, a unicast scenario may be identified (block 506). For example, the session manager 310 may determine that the threshold number (e.g., two) of user devices in the particular area that are viewing a particular live video is no longer met. For instance, the user device 210 may have left the multicast session and is no longer viewing the live video, thus leaving the user device 208 as the lone remaining viewer (e.g., below the threshold of two). In various aspects, the session manager 310 may monitor the number of user devices viewing a particular video in a particular area via the tables 402, 404, 406, and 408 in order to identify a unicast scenario.

Once a unicast scenario is identified, the multicast session is terminated (block 508). For example, the session manager 310 may communicate with the BMSC 106, the content provider proxy 306, and the user device proxy 308 to terminate the multicast session including the user devices 208 and 210. After the multicast session is terminated, the live video may be streamed by unicast to the remaining users devices viewing the live video.

The presently disclosed system was evaluated in a simulation using real data to demonstrate its effectiveness. Real-world live video traces were taken from a leading live content provider to analyze the performance of the provided system. The dataset presented a collection of over 750,000 live video streams with a fetch time period of 3 minutes. A total of 942 different categories of videos are included in the dataset with around 170,000 different broadcasters. The categories of videos include various genres such as sports, music, news, etc. It has been seen that around 17% of the total viewers of a specific live video are located within a 20 km vicinity of the broadcaster and 23% within a 50 km diameter. It can be concluded therefore that more than 23% of viewers watch the same live video while being within the same MNO core.

Initially, results were taken for initiating an on-the-fly multicast service in an NS3 simulator. The results show large bandwidth consumption, QoE, and data transmitted through the CDN difference. Then, a custom simulator was developed in C# for simulation. The reason to develop the custom simulator is that the available network simulators such as NS3, OMNET, OPNET do not offer the technical functionalities of eMBMS. The custom simulator imitated all the functionalities of required eMBMS entities such as BMSC, MBMS-GW, eNBs, and the user equipment.

In the simulation, an LTE dense network was imitated with the eNB radius of 3 km. The locations of eNBs and the users were plotted. The MBSFN areas were configured consisting of 8 eNBs at most, as per 3GPP specifications. A video of 4608 seconds was simulated with an average viewer count of 129 for a single eNB for that specific video within the specified area. A 480p representation video is considered in the simulation. The reason to select 480p is that the representation must be of an average quality so that various users with different channel qualities may receive it successfully. Three are a total of 22 fetch periods. In each fetch period the CQI or the data rates of the respective users remain the same.

Comprehensive simulations were performed to analyze the network load and resources used on the transit, backhaul, and RAN links. The obtained results were compared with the legacy unicast methods for live video transmission. The results and comparison with unicast are presented for two cases (a) SC-PTM and (b) MBSFN.

First, the results with the comparison of load on the transit link, i.e., the data transmitted by the CDN in unicast and multicast modes, are analyzed. The data transmitted by the eNB (backhaul link) is the same as the CDN. Therefore, only the results for data transmitted by CDN are shown. In this case, the MBSFN and SCPTM are considered as one scheme, i.e., multicast because the CQI selection at RAN level does not affect the bitrate of the video. The CDN transmits as many streams towards the MNO core as many requests are received by it. The cumulative data transmitted by the CDN (both unicast and multicast modes) was calculated over the period of 22 fetch cycles according to Equation 1 below.

$$\sum_{i=0}^{n} \sum_{j=0}^{m} D_j \times t_j \qquad \text{Equation 1}$$

$m$ = number of active users $n$ = number of active eNBs $D$ = total data received by a user $t$ = total active time of the user.

Figure 6:
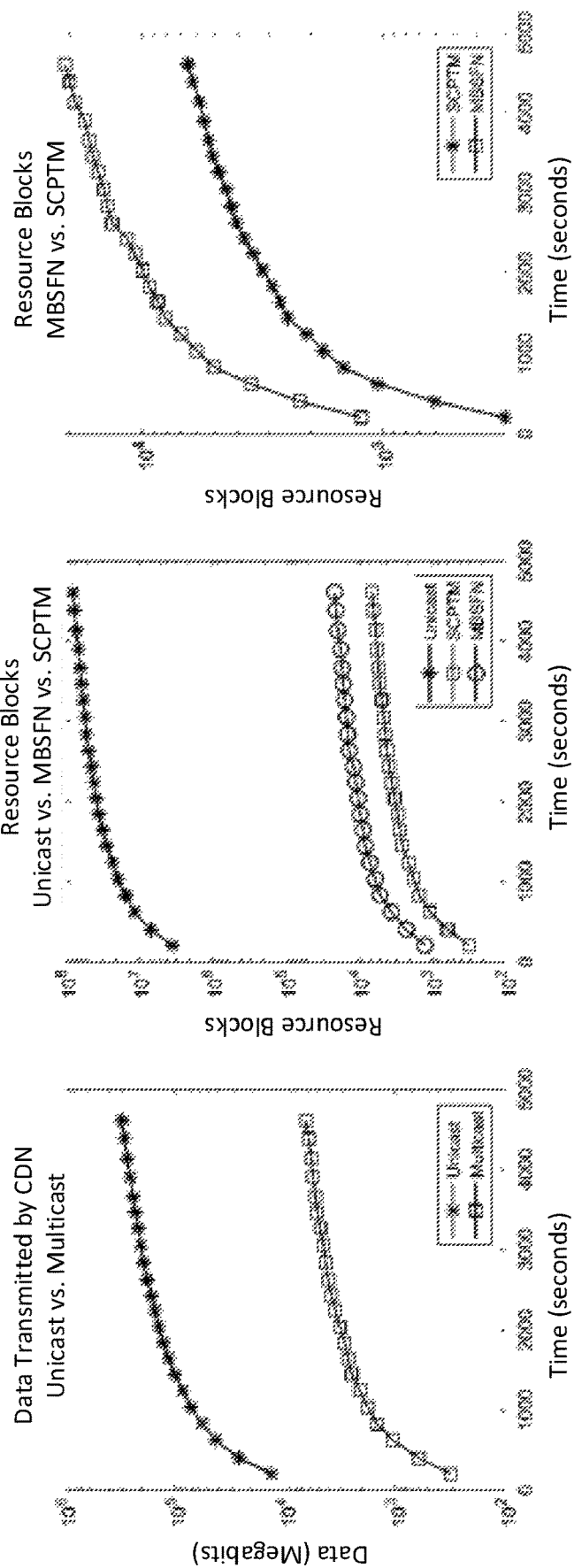
FIG. 6 illustrates log-scaled graphs of the cumulative data transmitted over time to all the requesting users and the total number of resource blocks assigned by the eNBs during the live video streaming using data from a first location.
Figure 7:
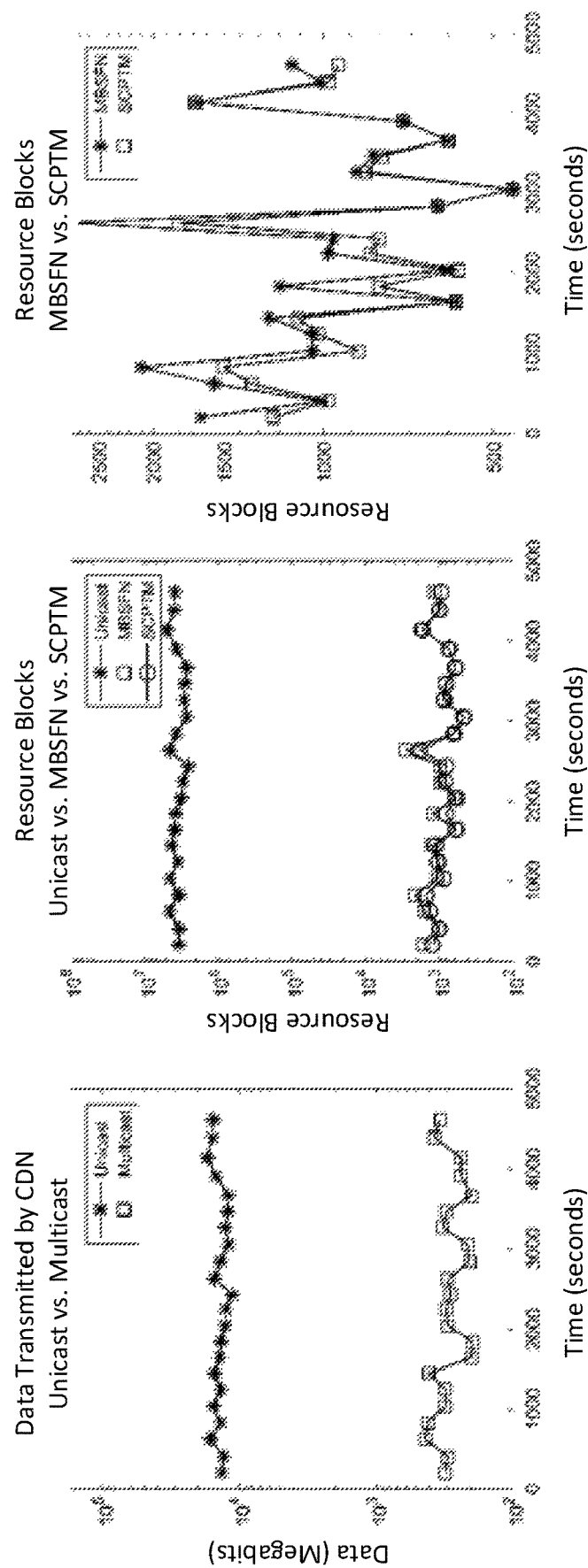
FIG. 7 illustrates plots for data transmitted over time and number of resource blocks assigned by the eNBs for each of the fetch cycles using data from a first location.

FIG. 6 illustrates log-scaled graphs of the cumulative data transmitted (Megabits) over time (seconds) to all the requesting users and the total number of resource blocks assigned by the eNBs during the live video streaming using data from a first location. FIG. 7 illustrates plots for data transmitted (Megabits) over time (seconds) and number of resource blocks assigned by the eNBs for each of the fetch cycles using data from a first location.

Resource Block is the smallest unit of data in LTE-A. In LTE-A, the data is transmitted in the form of Orthogonal Frequency Division Multiple Access (OFDMA) symbols, which carry a number of data bits. The number of data bits in one symbol depends on the Modulation and Coding Scheme (MCS) plus the Coding Rate (CR). The MCS is measured in Channel Quality Indicator (CQI) levels i.e., QPSK, 16-QAM, 64-QAM, and 256-QAM. The CR is measured in indices from 0 (worst) to 31 (best). The MCS and CR, on a combined level decide that how many data bits can be transferred in an OFDMA symbol. When a user's CQI is worst, the eNB has to assign more number of resource blocks to transmit a specific amount of data as compared to when the user's CQI is good. Moreover, number of resource blocks also depend on the number of streams flowing through an eNB. A greater number of streams will incur more usage of resource blocks.

In OFDMA, one resource block is composed of one slot, i.e., 0.5 milliseconds long. One slot is a grid of carries twelve subcarriers each of 15 khz in frequency with seven Resource Elements (RE) or symbols in each subcarrier. It means one resource block is composed of 84 Res. Two slots make one sub frame, i.e., 1 millisecond long. Ten sub frames compose one frame, i.e., 10 milliseconds in time. Finally, one second in OFDMA transmission carries a total of 168000 symbols or 2000 resource blocks. Equation 2 below was used to calculate the total number of resource blocks assigned by each eNB during the 4608 seconds of simulation time.

$$\sum_{i=0}^{n} \sum_{j=0}^{m} \frac{D_j \times t_j}{d_j} \times 2000 \qquad \text{Equation 2}$$

$m$ = number of active users $n$ = number of active eNBs $D$ = total data received by a user $t$ = total active time of the user $d$ = data rate of the user (depends on $CQI$).

In unicast, the CDN transmitted a total of 303940 Megabytes and in multicast 6485 Megabytes over the period of 4608 seconds. This shows that a huge amount of network load at the transit link is reduced by switching to the multicast transmission mode. The same can been seen for the total resource blocks used by all the participating eNBs throughout the live video streaming. These results show that a massive amount of resource blocks are saved at the RAN link by exploiting the multicasting technique.

Figure 8:
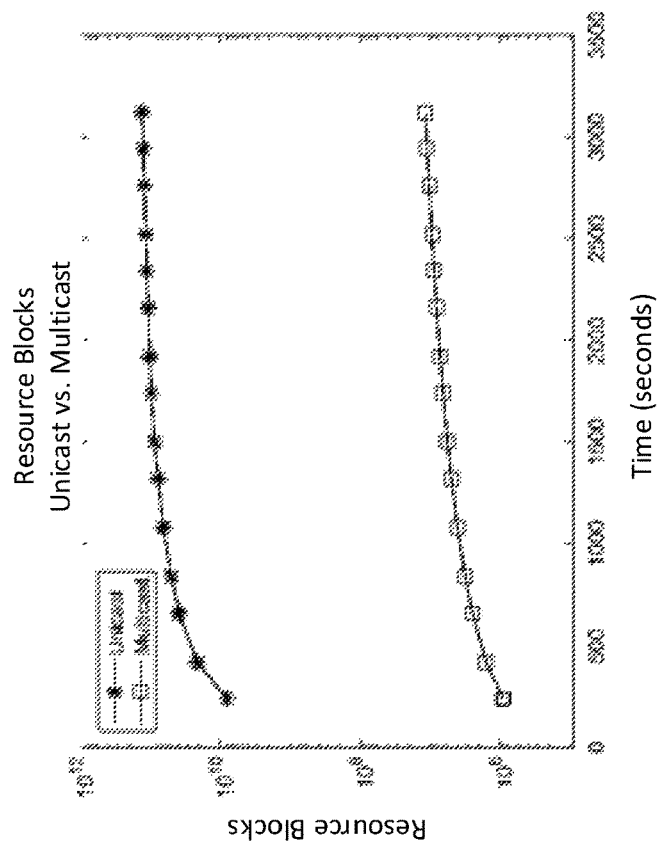
FIG. 8 illustrates log-scaled graphs of the cumulative data transmitted over time to all the requesting users and the total number of resource blocks assigned by the eNBs during the live video streaming using data from a second location.
Figure 8:
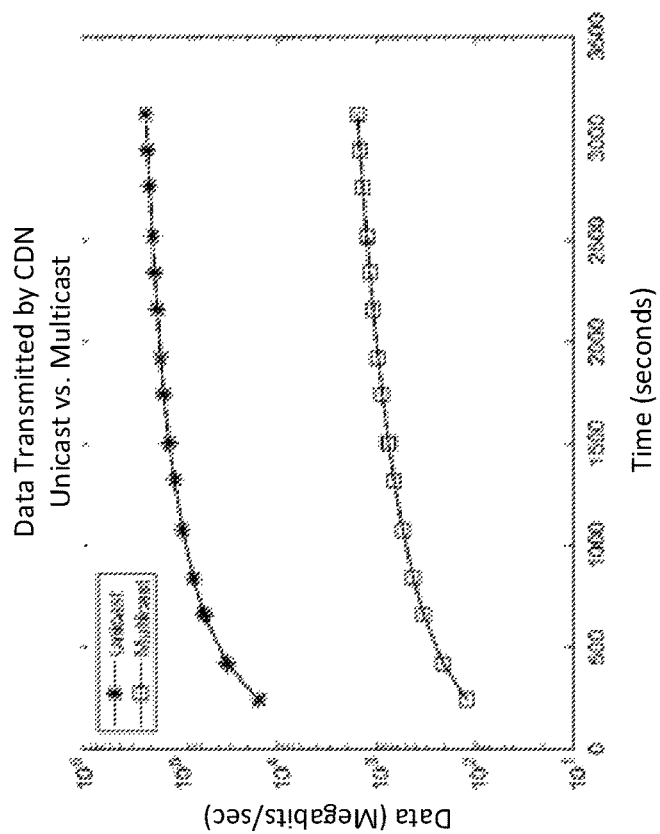
Figure 9:
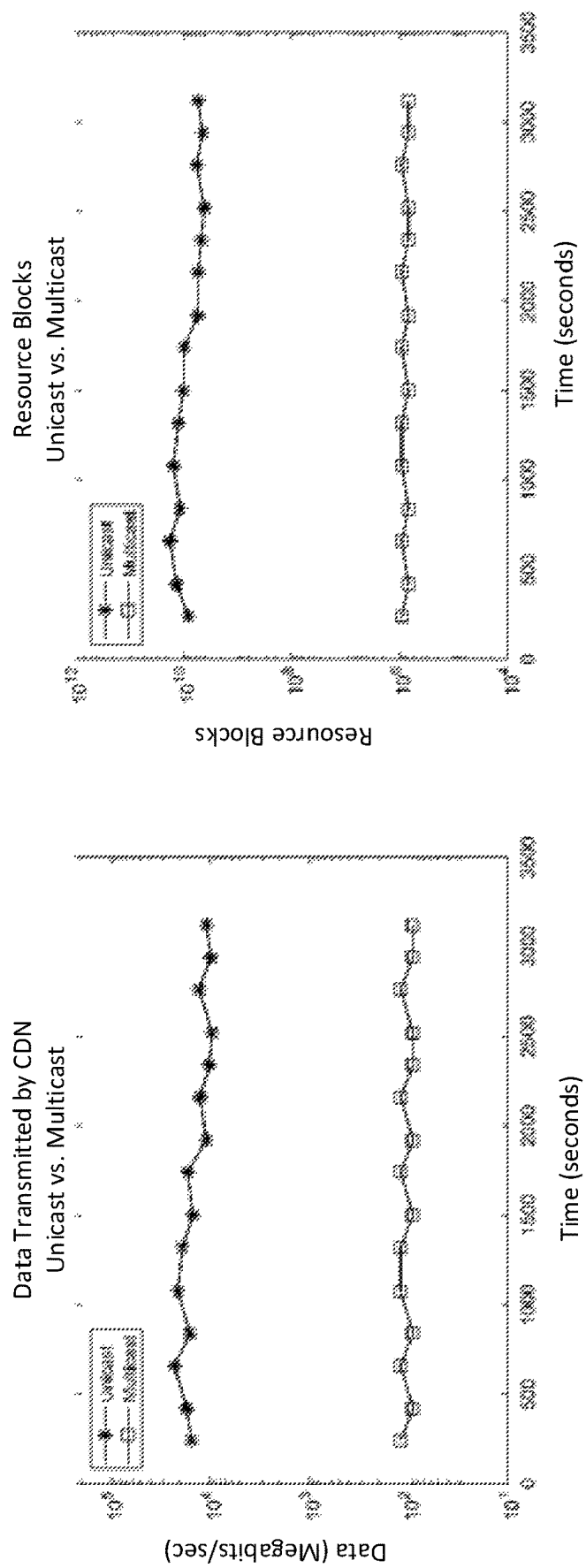
FIG. 9 illustrates plots for data transmitted over time and number of resource blocks assigned by the eNBs for each of the fetch cycles using data from a second location.

FIG. 8 illustrates log-scaled graphs of the cumulative data transmitted (Megabits) over time (seconds) to all the requesting users and the total number of resource blocks assigned by the eNBs during the live video streaming using data from a second location. FIG. 9 illustrates plots for data transmitted (Megabits) over time (seconds) and number of resource blocks assigned by the eNBs for each of the fetch cycles using data from a second location. The graphs in FIGS. 8 and 9 from the second location data depict the same results as the graphs in FIGS. 6 and 7 from the first location data except that the MBSFN and SCPTM show the identical results due to the fact that almost all the users lie within the same cluster. Therefore, there is a negligible difference in the CQIs of the users for both the locations.

The wireless bandwidth consumption is decreased in multicast at the edge as the provided system replaces multiple unicast transmissions by a single multicast transmission. The bandwidth saving can be calculated through Equation 3 below.

$$B_{multicast} = (N_{users} - 1) \times BR_{video}$$

$B_{multicast}$ is the bandwidth saved in multicast mode $N_{users}$ is the total number of users in each fetch time, receiving the same live video $BR_{video}$ is the average bitrate of the live video \qquad Equation 3.

Figure 10:
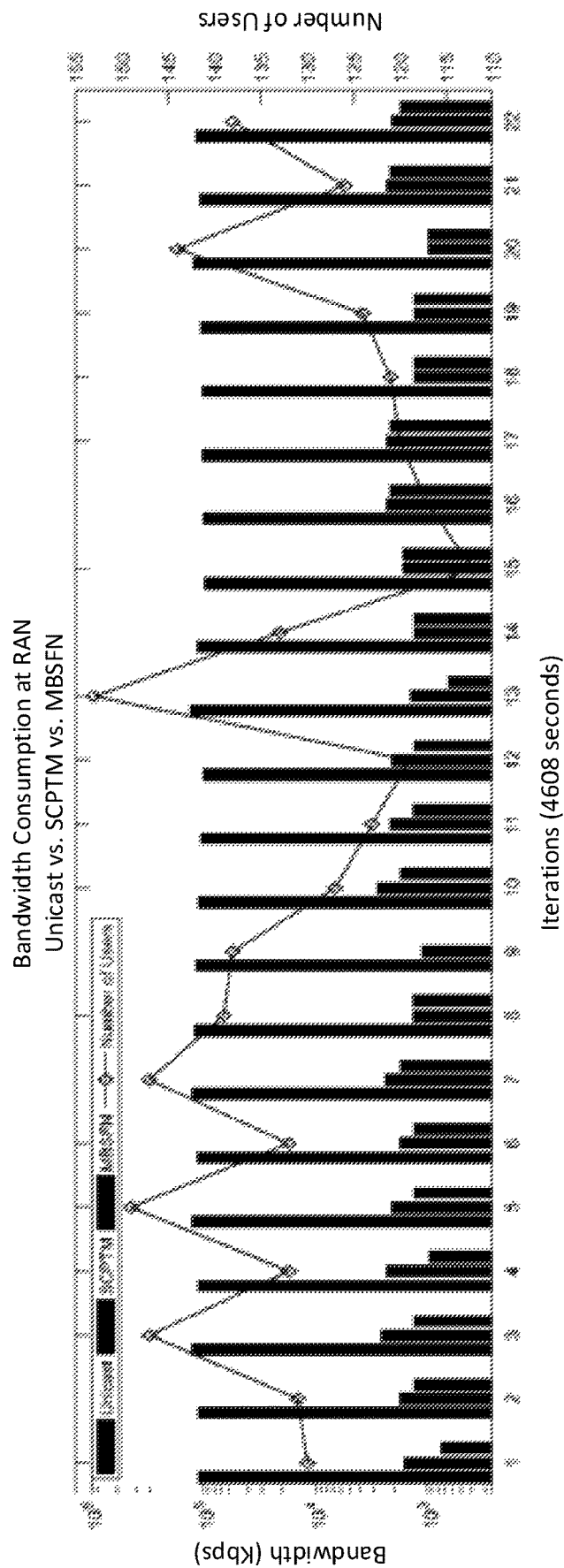
FIG. 10 shows the results of bandwidth used by all the participating eNBs through each iteration for the first location.
Figure 11:
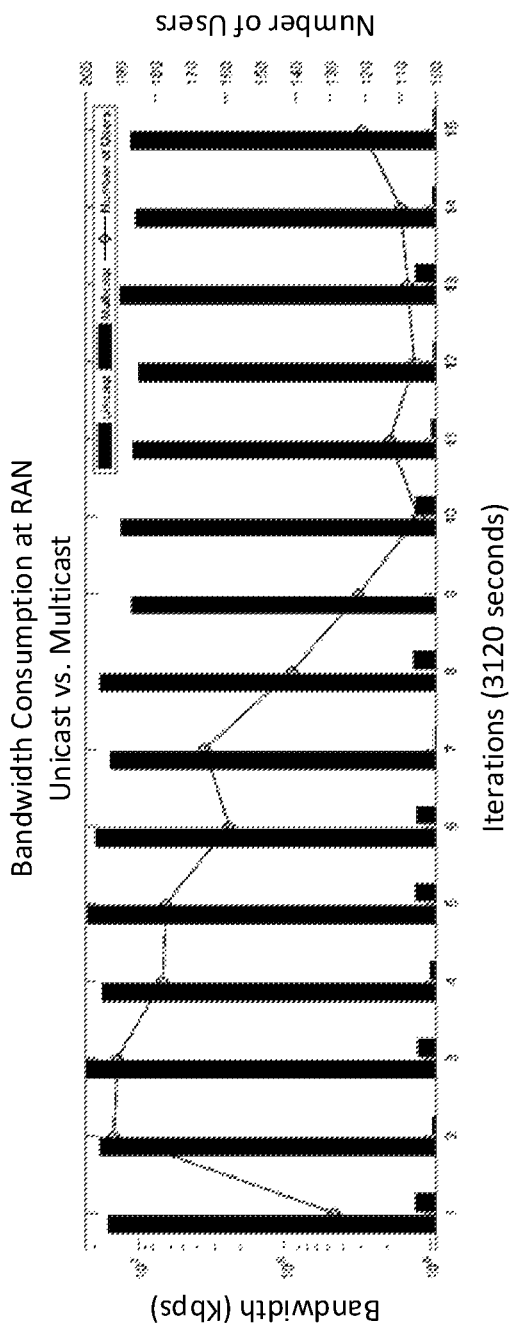
FIG. 11 show the results of bandwidth used by all the participating eNBs through each iteration for the second location.

The bandwidth consumption was calculated at backhaul link i.e., from the core network to the RAN for the time period of the live video streaming session. FIGS. 10 and 11 show the results of bandwidth used by all the participating eNBs through each iteration for the first location and the second location respectively. For each iteration displayed in FIG. 10, the leftmost bar corresponds to unicast, the middle bar corresponds to SCPTM, and the rightmost bar corresponds to MBSFN. The graphed line in FIG. 10 corresponds to a number of user devices. For each iteration in FIG. 11, the leftmost bar corresponds to unicast and the rightmost bar corresponds to multicast. The graphed line in FIG. 11 corresponds to a number of user devices.

The bandwidth consumption depends on the bitrate of the streamed video that is 0.5 Mbps, in this case, and the CQIs of the users receiving the stream. In general, the bandwidth consumption of the multicast session must be consistent throughout the streaming time once the multicast bearer is established regardless of the number of active users. Whereas, there is small variation in the bandwidth consumption of multicast session among different fetch cycles, which is due to the selection of new CQI value for each user after every iteration. The results in FIGS. 10 and 11 demonstrate that the bandwidth consumption in unicast transmission mode is much higher than the multicast mode as each user is assigned a different unicast bearer. Therefore, when a new user requests the same stream in unicast mode, the available bandwidth is shared among all the active users degrading the user QoS.

The storage overhead of a legacy tree based multicast scheme is $O(G \times T)$, where G is the size of the multicast group and the T is the size of the tree. The storage overhead of the multicast at the edge is $O(N_{cells})$ where $N_{cells}$ is the number of total cells participating in the multicast sessions. Although, there is the storage overhead in multicast at the edge, but this overhead is simpler than the storage overhead of a typical multicast scheme. The $O(G \times T)$ is the product of all the multicast trees and the users in it, whereas the $O(N_{cells})$ is the sum of all the users in the multicast group making it simpler than the other.

Multicast at edge achieves the data, bandwidth, and resource blocks saving at transit, backhaul and RAN links respectively at the expense of the pre-stall time required to switch the unicast transmission to the multicast mode. This pre-stall time includes the time required to search the potential wireless multicast scenario, time required to update the four-tables-mapping (e.g., the tables 402, 404, 406, 408), and time required to setup the multicast resource bearer. The provided system is considered to work continuously within the core network of the LTE environment. Therefore, the inventors estimate that there is incremental computation overhead when a new request for a video is received or when the status of an ongoing live video is changed. The storage structure of the provided system, i.e., four-tables-mapping can be implemented like a hashmap dictionary. Therefore, in general, the time complexity for looking up the specific video in the tables is $O(\log(m))$, where the m is the number of videos and the time complexity for the cell search is $O(\log(n))$, where n is the number of cells with multicast status. The average time complexity to update a multicast group is $O(L_{group})$, where the $L_{group}$ is the length of the group and time complexity of updating the tables is $O(1)$.

For the multicast resource bearer establishment, the main algorithm of the provided system transmits multiple SIB messages to user equipment and collaborates with the BMSC and content provider for information exchange. In general, a single SIB type 1-2 message needs 5.71 milliseconds to be transmitted and decoded by a CAT-3 UE. The provided system transmits at least four SIB messages to the user equipment, already discussed above. The provided system is a core network entity and acts as a part of the modified BMSC. Therefore, the time required for the communication between the provided system and the BMSC is negligible. This multicast resource bearer establishment overhead occurs only once for a live video when a second user requests the same live video. Once the multicast resource bearer is established, future users requesting to view the same live video will not have to wait for the multicast resource bearer establishment. For such future users after the second user, the pre-stall time will be the same as the playout buffer filling time.

The present disclosure provides an adaptive multicast solution to reduce the data transmitted by CDN (transit link load), bandwidth usage (backhaul link load), resource blocks usage (RAN link load) of live video streaming in wireless cellular network. The provided system adaptively sets up multicast groups according to potential wireless multicast scenarios. The provided system is deployed within the mobile network operator core to monitor all the live video streams and produce multicast streams. Simulation results demonstrate that the provided system could save a huge amount of network resources on transit, backhaul, and RAN links by exploiting the multicasting technique.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system comprising:
a plurality of user devices;
a content provider system configured to provide contemporaneous media content over a network to the plurality of user devices;
a multimedia broadcast multicast service; and
a proxy system configured to manage the initiation and termination of multicast sessions between the plurality of user devices and the content provider system, the proxy system including a memory and a processor in communication with the memory, wherein the processor is configured to:
receive a request from a respective user device for the content provider system to provide media content of a contemporaneous event;
determine whether a number of user devices viewing the media content meets a threshold;
initiate a multicast session in response to determining that the number of user devices meets the threshold, wherein initiating the multicast session includes:
transmitting a service announcement header to the multimedia broadcast multicast service on behalf of the content provider system,
receiving identification information from the respective user device,
transmitting a join request for the respective user device to the multimedia broadcast multicast service in response to receiving the identification information, the join request including the received identification information,
receiving the join request from the multimedia broadcast multicast service on behalf of the content provider system,
transmitting multicast authorization for the respective user device to the multimedia broadcast multicast service on behalf of the content provider system in response to receiving the join request from the multimedia broadcast multicast service, the multicast authorization including a multicast IP address, assigning a set of user devices to the initiated multicast session, the set of user devices including the respective user device, and the multicast session being associated with the multicast IP address, and transmitting the multicast IP address to the set of user devices.

2. The system of claim 1, wherein the contemporaneous media content is video.

3. The system of claim 1, wherein the multimedia broadcast multicast service is an enhanced multimedia broadcast multicast service.

4. The system of claim 1, wherein initiating the multicast session further includes receiving a service announcement from the multimedia broadcast multicast service.

5. The system of claim 1, wherein the proxy system is in communication with the multimedia broadcast multicast service at a core network level.

6. The system of claim 1, wherein the number of user devices viewing the media content are within a pre-determined geographical area.

7. The system of claim 6, wherein the pre-determined geographical area is a coverage area of a core network that includes the multimedia broadcast multicast service and the proxy system.

8. The system of claim 1, wherein the multimedia broadcast multicast service transmits the media content from the content provider system to the set of user devices via the multicast IP address.

9. The system of claim 1, wherein the proxy system is a virtual network function service.

10. The system of claim 1, wherein the content provider system is not a multicast service provider.

11. A system comprising:
a memory; and
a processor in communication with the memory, the processor configured to:
receive a request from a user device for a content provider system to provide media content of a contemporaneous event;
determine whether a number of user devices viewing the media content meets a threshold;
initiate a multicast session in response to determining that the number of user devices meets the threshold, wherein initiating the multicast session includes:
transmitting a service announcement header to a multimedia broadcast multicast service on behalf of the content provider system,
receiving identification information from the user device,
transmitting a join request for the respective user device to the multimedia broadcast multicast service in response to receiving the identification information, the join request including the received identification information,
receiving the join request from the multimedia broadcast multicast service on behalf of the content provider system,
transmitting multicast authorization for the respective user device to the multimedia broadcast multicast service on behalf of the content provider system in response to receiving the join request from the multimedia broadcast multicast service, the multicast authorization including a multicast IP address,
assigning the user device to the initiated multicast session, the multicast session being associated with the multicast IP address, and
transmitting the multicast IP address to the user device.

12. The system of claim 11, wherein the processor is further configured to terminate the multicast session in response to determining that the number of user devices no longer meets the threshold.

13. The system of claim 12, wherein the processor is further configured to initiate a unicast session in response to terminating the multicast session.

14. The system of claim 11, wherein the service announcement header includes a service ID, a service type, a session time, a media type, a mode, a multicast IP address, and a service area.

15. The system of claim 11, wherein initiating the multicast session further includes activating a packet data protocol instance on behalf of the user device.

16. The system of claim 11, wherein initiating the multicast session further includes, prior to transmitting multicast authorization, receiving a message from the multimedia broadcast multicast service that queries an availability of service in a cell ID of the user device, the cell ID of the user device being included in the identification information.

17. A non-transitory, computer-readable medium storing instructions which, when executed by a processor, cause the processor to:
receive a request from a user device for a content provider system to provide media content of a contemporaneous event;
determine whether a number of user devices viewing the media content meets a threshold;
initiate a multicast session in response to determining that the number of user devices meets the threshold, wherein initiating the multicast session includes:
transmitting a service announcement header to a multimedia broadcast multicast service on behalf of the content provider system,
receiving identification information from the user device,
transmitting a join request for the respective user device to the multimedia broadcast multicast service in response to receiving the identification information, the join request including the received identification information,
receiving the join request from the multimedia broadcast multicast service on behalf of the content provider system,
transmitting multicast authorization for the respective user device to the multimedia broadcast multicast service on behalf of the content provider system in response to receiving the join request from the multimedia broadcast multicast service, the multicast authorization including a multicast IP address,
assigning the user device to the initiated multicast session, the multicast session being associated with the multicast IP address, and
transmitting the multicast IP address to the user device.

18. The non-transitory, computer-readable medium of claim 17, wherein initiating the multicast session includes imitating the actions of a multicast service provider on behalf of the content provider system.

19. The non-transitory, computer-readable medium of claim 17, wherein initiating the multicast session includes imitating the actions of a device in communication with a multicast service provider on behalf of the user device.

20. The non-transitory, computer-readable medium of claim 17, wherein the identification information includes a mobile station international subscriber directory number and a cell ID.

* * * * *